United States Patent [19]

Eickemeyer et al.

[11] Patent Number: 6,049,867
[45] Date of Patent: Apr. 11, 2000

[54] METHOD AND SYSTEM FOR MULTI-THREAD SWITCHING ONLY WHEN A CACHE MISS OCCURS AT A SECOND OR HIGHER LEVEL

[75] Inventors: Richard James Eickemeyer; Ross Evan Johnson; Harold F. Kossman; Steven Raymond Kunkel; Timothy John Mullins; James Allen Rose, all of Rochester, Minn.

[73] Assignee: International Business Machines Corporation, Armonk, N.Y.

[21] Appl. No.: 08/906,228

[22] Filed: Aug. 4, 1997

Related U.S. Application Data

[63] Continuation of application No. 08/473,692, Jun. 7, 1995, abandoned.

[51] Int. Cl.[7] .................................................. G06F 9/38
[52] U.S. Cl. .......................... 712/228; 711/122; 709/678
[58] Field of Search ................................... 395/569, 677, 395/449, 678, 444; 712/228; 711/122; 709/677, 678

[56] References Cited

U.S. PATENT DOCUMENTS 3,913,070 10/1975 Malcolm et al. .
4,229,790 10/1980 Gilliland et al. .
4,434,461  2/1984 Puhl ....................................... 395/733

(List continued on next page.)

FOREIGN PATENT DOCUMENTS 2 234 613  6/1991  United Kingdom .

OTHER PUBLICATIONS

An ACM 0884–7495/89/0000/0273—1989—*Wolf–Dietrich Weber and Annop Gupta*, "Exploring the Benefits of Multiple Hardware Contexts in a Multiprocessor Architecture: Preliminary Results".

IEEE Transactions on Computers, vol. C–36, NO. 12, Dec. 1987, "Incorporating Data Flows Ideas into von Neumann Processors for Parrallel Execution," Richard Buehrer and Kattamuri Ekanadham.

Dongarra, Jack J., "A Survey of High Performance Computers", U.S. Government Work, pp. 8–11 (Jan. 10, 1998).

Iannucci, Robert A., "Two Fundamental Issues in Multiprocessing", Laboratory for Computer Science, Massachusetts Institute of Technology, Proceeding of the DFVLR Conference, pp. 61–88 (Jun. 25–29, 1987).

Kuck, David J., "The Burroughs Scientific Processor (BSP)", IEEE Transactions on Computers, vol. C–31, No. 5, pp. 363–376 (May 1982).

Thekkath, Radhika et al., "The Effectiveness of Multiple Hardware Contexts", Department of Computer Science and Engineering, FR–35, University of Washington, pp. 328–337 (1994).

(List continued on next page.)

*Primary Examiner*—Thomas C. Lee
*Assistant Examiner*—Gautam R. Patel
*Attorney, Agent, or Firm*—Felsman, Bradley, Vaden, Gunter & Dillon; Jack V. Musgrove; Andrew J. Dillon

[57] ABSTRACT

A method and system for enhanced performance multithread operation in a data processing system which includes a processor, a main memory store and at least two levels of cache memory. At least one instruction within an initial thread is executed. Thereafter, the state of the processor at a selected point within the first thread is stored, execution of the first thread is terminated and a second thread is selected for execution only in response to a level two or higher cache miss, thereby minimizing processor delays due to memory latency. The validity state of each thread is preferably maintained in order to minimize the likelihood of returning to a prior thread for execution before the cache miss has been corrected. A least recently executed thread is preferably selected for execution in the event of a nonvalidity indication in association with all remaining threads, in anticipation of a change to the valid status of that thread prior to all other threads. A thread switch bit may also be utilized to selectively inhibit thread switching where execution of a particular thread is deemed necessary.

25 Claims, 6 Drawing Sheets

U.S. PATENT DOCUMENTS

| | | | |
|---|---|---|---|
| 4,805,107 | 2/1989 | Kieckhafer et al. . | |
| 5,003,462 | 3/1991 | Blaner et al. . | |
| 5,012,409 | 4/1991 | Fletcher et al. . | |
| 5,109,512 | 4/1992 | Bahr et al. . | |
| 5,142,677 | 8/1992 | Ehlig et al. | 395/375 |
| 5,179,702 | 1/1993 | Spix et al. . | |
| 5,210,871 | 5/1993 | Lala et al. . | |
| 5,220,653 | 6/1993 | Miro . | |
| 5,247,675 | 9/1993 | Farrell et al. . | |
| 5,247,677 | 9/1993 | Welland et al. . | |
| 5,261,099 | 11/1993 | Bigo et al. . | |
| 5,357,617 | 10/1994 | Davis et al. | 395/375 |
| 5,361,334 | 11/1994 | Crawley | 395/200 |
| 5,361,337 | 11/1994 | Okin | 395/375 |
| 5,426,744 | 6/1995 | Sawase et al. | 395/375 |
| 5,430,851 | 7/1995 | Hirata et al. | 395/375 |
| 5,457,793 | 10/1995 | Elko et al. | 395/621 |
| 5,526,521 | 6/1996 | Fitch et al. | 395/678 |
| 5,694,603 | 12/1997 | Reiffen | 395/677 |
| 5,694,604 | 12/1997 | Reiffen | 395/677 |

OTHER PUBLICATIONS

Tomasulo, R. M., "An Efficient Algorithm for Exploiting Multiple Arithmetic Units", IBM Journal, pp. 25–33 (Jan. 1967).

Weber, Wolf–Dietrich et al., "Exploring the Benefits of Multiple Hardware Contexts in a Multiprocessor Architecture: Preliminary Results", the 16th Annual International Symposium on Computer Architecture, IEEE Computer Society Press, pp. 272–280 (1989).

Willis, Dr. John et al., "What is Data–Driven, Multithread Architecture", IBM Technical Report TRO7.2232, pp. 1–21 (Aug. 24, 1995).

Richard Buehrer and Kattamuri Ekanadham, "Incorporating Data Flow Ideas into von Neumann Processors for Parallel Execution," IEEE Transactions on Computers, vol. C–36, No. 12, (Dec. 1987).

Microprocessor Report vol. 11, No. 9, Jul. 14, 1997, P. Song, "Multithread comes of age", pp. 13–18, and also IAC Accession No. 19613947.

METHOD AND SYSTEM FOR MULTI-THREAD SWITCHING ONLY WHEN A CACHE MISS OCCURS AT A SECOND OR HIGHER LEVEL

This is a continuation of application Ser. No. 08/473,692, filed Jun. 7, 1995 now abandoned.

BACKGROUND OF THE INVENTION

1. Technical Field

The present invention relates in general to an improved data processing system and in particular to an improved high performance multithread data processing system. Still more particularly the present invention relates to a method and system for reducing the impact of memory latency in a multithread data processing system.

2. Description of the Related Art

Single tasking operating systems have been available for many years within computer systems. In such systems, a computer processor executes computer programs or program subroutines serially, that is no computer program or program subroutine can begin to execute until the previous computer program or program subroutine has terminated. This type of operating system does not make optimum use of the computer processor in a case where an executing computer program or subroutine must await the occurrence of an external event (such as the availability of data or a resource) because processor time is wasted.

This problem has lead to the advent of operating systems. Each of the program threads performs a specific task. While a computer processor can execute only one program thread at a time, if the thread being executed must wait for the occurrence of an external event, i.e., the thread becomes "non-dispatchable," execution of a non-dispatchable thread is suspended and the computer processor executes another thread of the same or different computer program to optimize utilization of processor assets. Multitasking operating systems have also been extended to multiprocessor environments where threads of the same or different programs can execute in parallel on different computer processors. While such multitasking operating systems optimize the use of one or more processors, they do not permit the application program developer to adequately influence the scheduling of the execution of threads.

Previously developed hardware multithread processors which maintain multiple states of different programs and permit the ability to switch between those states quickly typically switch threads at every memory reference, cache miss or stall. Memory latencies in modern microprocessors are too long and first level on-chip cache sizes are generally quite small. For example, in an object-oriented programming environment program locality is worse than in traditional environments. Such a situation results in increased delays due to increased memory access rendering the data processing system less cost-effective.

Existing multithreading techniques describe switching threads on a cache miss or a memory reference. A primary example of this technique may be reviewed in "Sparcle: An Evolutionary Design for Large-Scale Multiprocessors," IEEE Micro Volume 13, No.3, pp. 48–60, June 1993. As applied in a so-called "RISC" (reduced instructions set computing) architecture multiple register sets normally utilized to support function calls are modified to maintain multiple threads. Eight overlapping register windows are modified to become four non-overlapping register sets, wherein each register set is a reserve for trap and message handling. This system discloses a thread switch which occurs on each first level cache miss that results in a remote memory request.

While this system represents an advance in the art, modern processor designs often utilize a multiple level cache or high speed memory which is attached to the processor. The processor system utilizes some well-known algorithm to decide what portion of its main memory store will be loaded within each level of cache and thus, each time a memory reference occurs which is not present within the first level of cache the processor must attempt to obtain that memory reference from a second or higher level of cache.

It should thus be apparent that a need exists for an improved data processing system which can reduce delays due to memory latency in a multilevel cache system utilized in conjunction with a multithread data processing system.

SUMMARY OF THE INVENTION

It is therefore one object of the present invention to provide an improved data processing system.

It is another object of the present invention to provide an improved high performance multithread data processor system.

It is yet another object of the present invention to provide an improved method and system for reducing delays due to memory latency in a multithread data processing system.

The foregoing objects are achieved as is now described. A method and system are disclosed for enhanced performance multithread operation in a data processing system which includes a processor, a main memory store and at least two levels of cache memory. At least one instruction within an initial thread is executed. Thereafter, the state of the processor at a selected point within the first thread is stored, execution of the first thread is terminated and a second thread is selected for execution only in response to a level two or higher cache miss, thereby minimizing processor delays due to memory latency. The validity state of each thread is preferably maintained in order to minimize the likelihood of returning to a prior thread for execution before the cache miss has been corrected. A least recently executed thread is preferably selected for execution in the event of a nonvalidity indication in association with all remaining threads, in anticipation of a change to the valid status of that thread prior to all other threads. A thread switch bit may also be utilized to selectively inhibit thread switching where execution of the current thread is deemed necessary.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
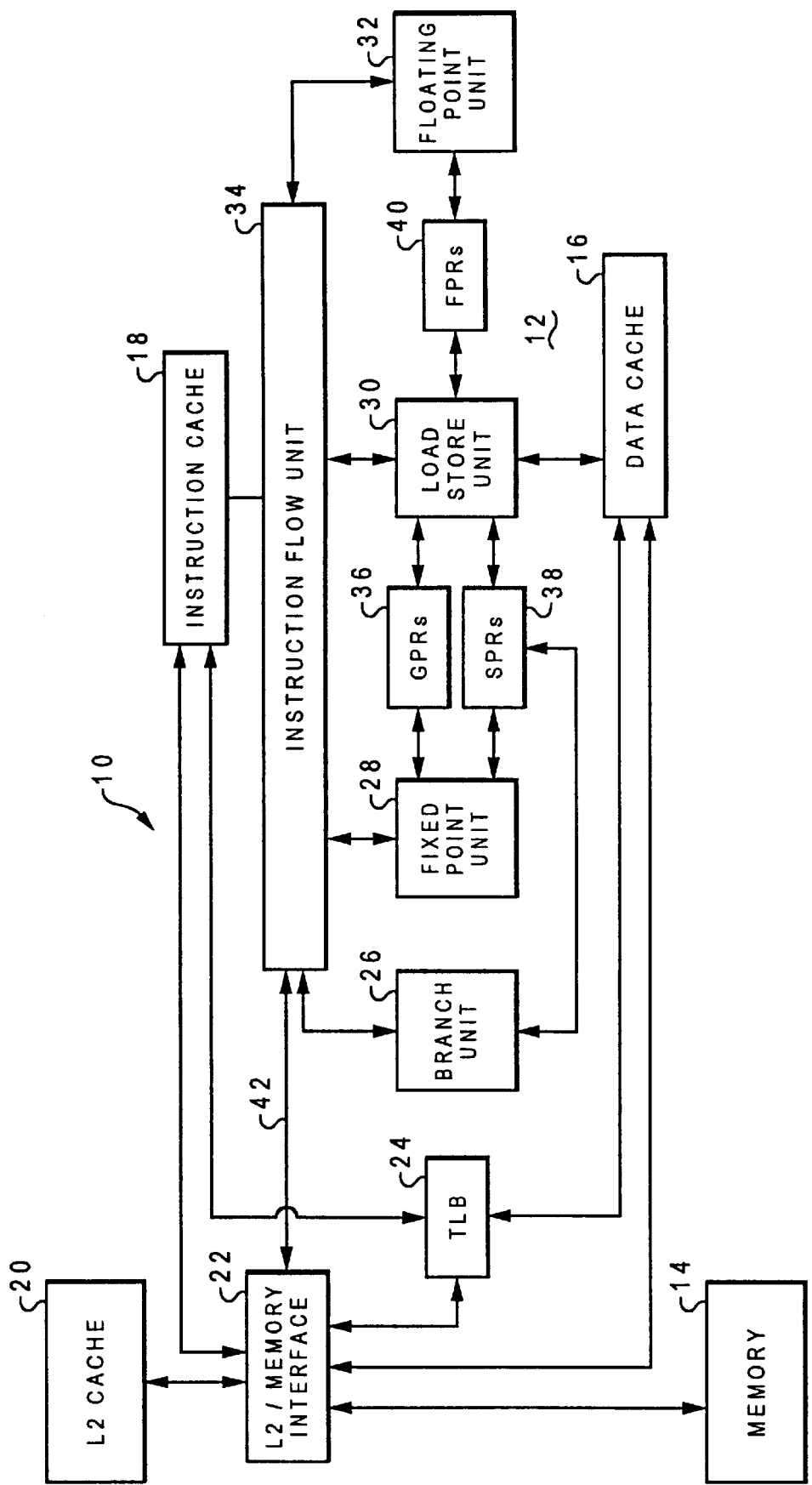
FIG. 1 is a high level block diagram of a data processing system which may be utilized to implement the method and system of the present invention.

With reference now to the figures and in particular with reference to FIG. 1, there is depicted a high level block diagram of a data processing system 10 which may be utilized to implement the method and system of the present invention. In a preferred embodiment processor 12 of system 10 is a single integrated circuit superscalar microprocessor, which may be implemented utilizing any well-known superscalar microprocessor system such as the PowerPC Microprocessor manufactured by International Business Machines Corporation of Armonk, N.Y. As will be discussed below data processing system 10 preferably includes various units, registers, buffers, memories and other sections which are all preferably formed by integrated circuitry. As those skilled in the art will appreciate data processing system 10 preferably operates according to reduced instruction set computing (RISC) techniques.

As illustrated, data processing system 10 preferably includes a main memory store 14, a data cache 16 and instruction cache 18 which are interconnected utilizing various bus connections. Instructions from instruction cache 18 are preferably output to instruction flow unit 34 which, in accordance with the method and system of the present invention, controls the execution of multiple threads by the various subprocessor units within data processing system 10. Instruction flow unit 34 selectively outputs instructions to various execution circuitry within data processing system 10 including branch unit 26, fixed point unit 28, load/store unit 30 and floating point unit 32.

In addition to the various execution units depicted within FIG. 1 those skilled in the art will appreciate that modern superscalar microprocessor systems often include multiple versions of each such execution unit. Each of these execution units will have as an input source operand information from various registers such as general purpose registers 36 and floating point registers 40. Additionally, multiple special purpose registers 38 may be utilized in accordance with the method and system of the present invention to store processor state information in response to thread switching.

In a manner well known to those having ordinary skill in the art in response to a load instruction load/store unit 30 will input information from data cache 16 and copy that information to selected buffers for utilization by one of the plurality of execution units. Data cache 16 is preferably a small memory which utilizes high speed memory devices and which stores data which is considered likely to be utilized frequently or in the near future by data processing system. In accordance with an important feature of the present invention a second level cache 20 is also provided which, in an inclusive system, will include all data stored within data cache 16 and a larger amount of data copied from main memory store 14. Level two cache 20 is preferably a higher speed memory system than main memory store 14 and, by storing selected data within level two cache 20 in accordance with various well known techniques the memory latency which occurs as a result of a reference to main memory store 14 can be minimized.

A level two cache/memory interface 22 is also provided in accordance with the method and system of the present invention. As illustrated, a bus 42 is provided between level two cache/memory interface 22 and instruction flow unit 34 to indicate to instruction flow unit 34 a miss within level two cache 20. That is, an attempt to access data within the system which is not present within level two cache 20. Further, a so-called "Translation Lookaside Buffer" (TLB) 24 is provided which contains virtual-to-real address mapping. Although not illustrated within the present invention various additional high level memory mapping buffers may be provided such as a Segment Lookaside Buffer (SLB) which will operate in a manner similar to that described for translation lookaside buffer 24.

Thus, in accordance with an important feature of the present invention delays due to memory latency within data processing system 10 may be reduced by switching between multiple threads in response to the occurrence of an event which indicates long memory latency may occur. In one embodiment of the system depicted within FIG. 1 a thread switch will occur, if enabled, in response to a level two cache miss on a fetch. That is, an attempt by the processor to access the level two cache to determine whether or not a memory request can be satisfied and an indication that the desired data or instruction is not present within the level two cache. This occurrence is typically processed by causing a memory request to be retrieved from main memory store 14 and the memory latency which occurs during this period triggers, in accordance with the method and system of the present invention, a thread switch. In alternate embodiments of the present invention a thread switch is triggered only in response to the occurrence of those events which will take a longer period of time to complete than is required to refill the instruction pipeline (typically 5 or 6 cycles). Thus, a thread switch may be triggered in response to a Translation Lookaside Buffer (TLB) Miss or Invalidate, a Segment Lookaside Buffer (SLB) Miss or Invalidate, a failed conditional store operation or other operation which require, on average, a period of time which is longer than the time required for a thread switch. By only switching threads in response to such events the necessity for increased complexity and replication of pipeline latches and additional pipeline states is avoided.

A thread is accomplished, as described herein, by providing a thread state register within a dedicated special purpose register 38. This thread state register preferably includes an indication of the current thread number, and indication of whether single-thread or multi-thread operation is enabled and a validity indication bit for each thread. Thus, if four threads are permitted within data processing system 10, seven bits are required to indicate this information. Additionally, two existing special purpose registers are utilized as save-restore registers to store the address of the instruction which caused the level two cache miss and store the machine state register.

In accordance with the method and system of the present invention level two cache/memory interface 22 preferably permits multiple outstanding memory requests. That is, one outstanding memory request per thread. Thus, when a first thread is suspended in response to the occurrence of a level two cache miss a second thread would be able to access the level two cache for data present therein. If the second thread also results in a level two cache miss another memory request will be issued and thus multiple memory requests must be maintained within level two cache/memory interface 22. Further, in order to minimize so-called "thrashing" the method and system of the present invention requires that at least a first instruction within each thread must complete. Thus, if all threads within the system are awaiting a level two cache miss and the first thread is resumed it will not find the required data; however, in response to a requirement that at least the first instruction must complete this thread will simply wait until the cache miss has been satisfied.

Thus, those skilled in the art should appreciate that "multithreading," as defined within the present disclosure wherein multiple independent threads are executing may be accomplished in hardware in accordance with the method and system of the present invention may be utilized to greatly reduce the delay due to memory latency by maintaining the state of multiple threads (preferably two or three in accordance with the current design) and selectively switching between those threads only in response to a second level or higher cache miss.

Figure 2:
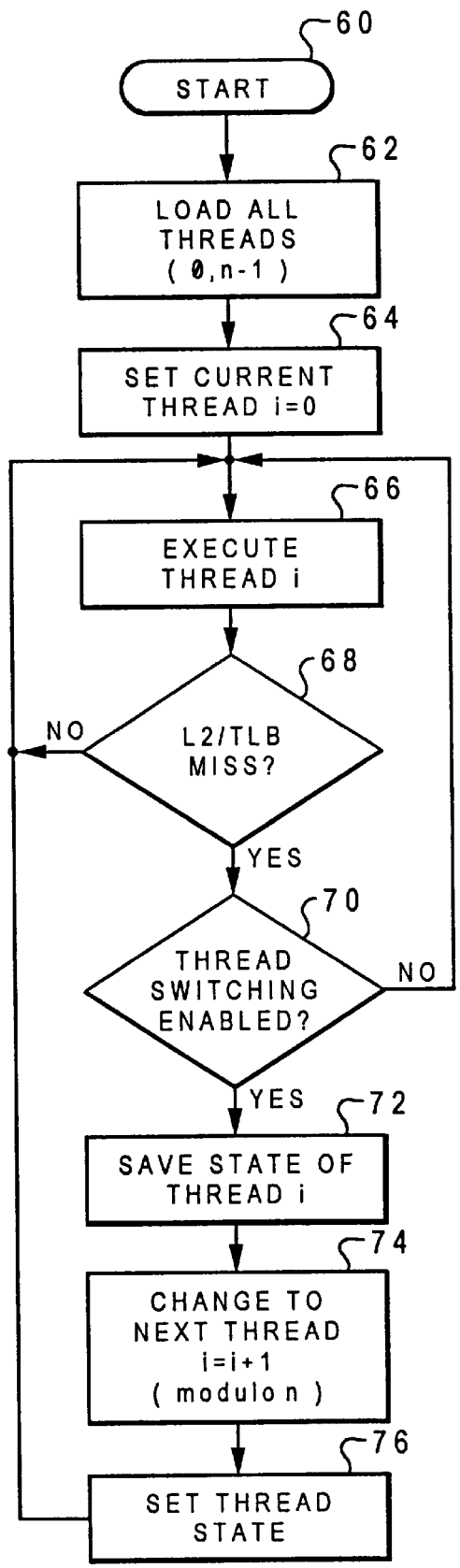
FIG. 2 is a high level logic flowchart of a process which may be implemented within the data processing system of FIG. 1 which illustrates basic operation in accordance with the method and system of the present invention.

Referring now to FIG. 2 there is depicted a high level logic flowchart of a process which may be implemented within the data processing system of FIG. 1 which illustrates basic operation in accordance with the method and system of the present invention. As depicted, the process begins at block 60 and thereafter passes to block 62. Block 62 illustrates the loading of all threads. The process then passes to block 64 which depicts the setting of the current thread i=0. Block 66 then depicts the execution of thread i until such time as the process passes to block 68. Block 68 illustrate the occurrence of a level two cache or translation lookaside buffer (TLB) miss. In the event no such miss occurs the process returns, in an iterative fashion, to block 66 to continue to execute thread i.

Referring again to block 68 in the event a level two cache or translation lookaside buffer miss has occurred, the process passes to block 70. Block 70, in accordance with an important feature of the present invention, illustrates a determination of whether or not thread switching within the system is enabled. Those having ordinary skill in the art will appreciate that in selected instances execution of a particular thread will be desirable and thus, the method and system of the present invention provides a technique whereby the switching between multiple threads may be disabled. In the event thread switching is not enabled the process passes from block 70 back to block 66 in an iterative fashion to await the satisfaction of the level two cache miss.

Referring again to block 70, in the event thread switching is enabled the process passes to block 72. Block 72 illustrates the saving of the state of instruction register and the machine state register for thread i utilizing the special purpose registers (see FIG. 1) and the process then passes to block 74. Block 74 illustrates the changing of the current thread to the next thread by incrementing i, accessing the appropriate registers and the process then passes to block 76. Block 76 illustrates the setting of the thread state for the new current thread and the process then returns to block 66 in an iterative fashion.

Figure 3:
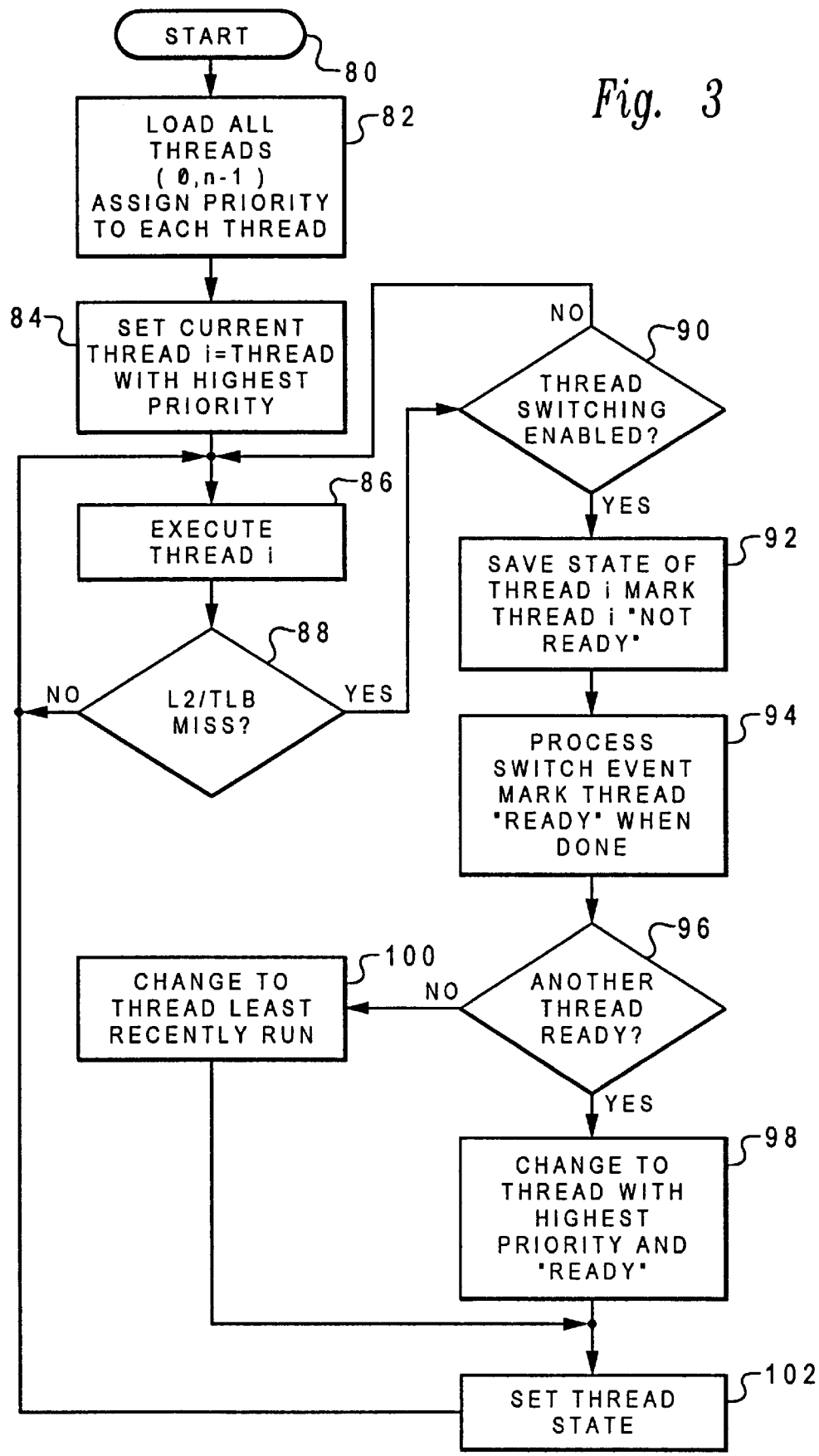
FIG. 3 is a high level logic flowchart of a process which may be implemented within the data processing system of FIG. 1 which illustrates a simple prioritized thread management system in accordance with the method and system of the present invention.

With reference now to FIG. 3 there is depicted a high level logic flowchart which illustrates a process which may be implemented within the data processing system of FIG. 1 which depicts a simple prioritized thread management system in accordance with the method and system of the present invention. As illustrated, this process begins at block 80 and thereafter passes to block 82. Block 82 illustrates the loading of all threads (0, n−1) and the assignment of an associated priority for each thread. The process then passes to block 84 which depicts the setting of the current thread i equal to the thread having the highest priority. Thereafter, the process passes to block 86.

Block 86 illustrates the execution of thread i and the process then passes to block 88. Block 88 illustrates a determination of whether or not a level two cache or translation lookaside buffer miss has occurred and if not, as above, the process returns to block 86 in an iterative fashion to continue to execute thread i.

Still referring to block 88, in the event a level two cache or translation lookaside buffer miss has occurred the process passes to block 90. Block 90, as described above, illustrates a determination of whether or not thread switching is enabled, and if not, the process returns to block 86 in an iterative fashion. However, in the event thread switching is enabled, the process passes to block 92.

Block 92 depicts the saving of the state of thread i and the marking of that thread as "NOT READY." Thereafter, the process passes to block 94. Block 94 depicts the concurrent processing of the switch event and the marking of that thread as "READY" when the switch event has been resolved. That is, when the level two miss has been satisfied by obtaining the desired data from main memory store. Continuing, the process passes to block 96, while processing the switch event as described above, to determine whether or not another thread is ready for execution. If so, the process passes to block 98 which illustrates the changing of the current thread to the thread having the highest priority and a "READY" indication. That thread's thread state is then set, as depicted within block 102 and the process then returns to block 86, in an iterative fashion as described above.

Referring again to block 96, in accordance with an important feature of the present invention, in the event another thread within the system does not indicate "READY" the process passes to block 100. Block 100 illustrates the changing of the current thread to the thread which is least recently run. This occurs as a result of a decision that the thread which was least recently run is the thread most likely to resolve its switch event prior to a subsequent thread and thus, delays due to memory latency will be minimized by selection of this thread as the current thread. The process then passes to block 102 which illustrates the setting of the thread state for this selected thread and the process then returns to block 86 in an iterative fashion.

Figure 4:
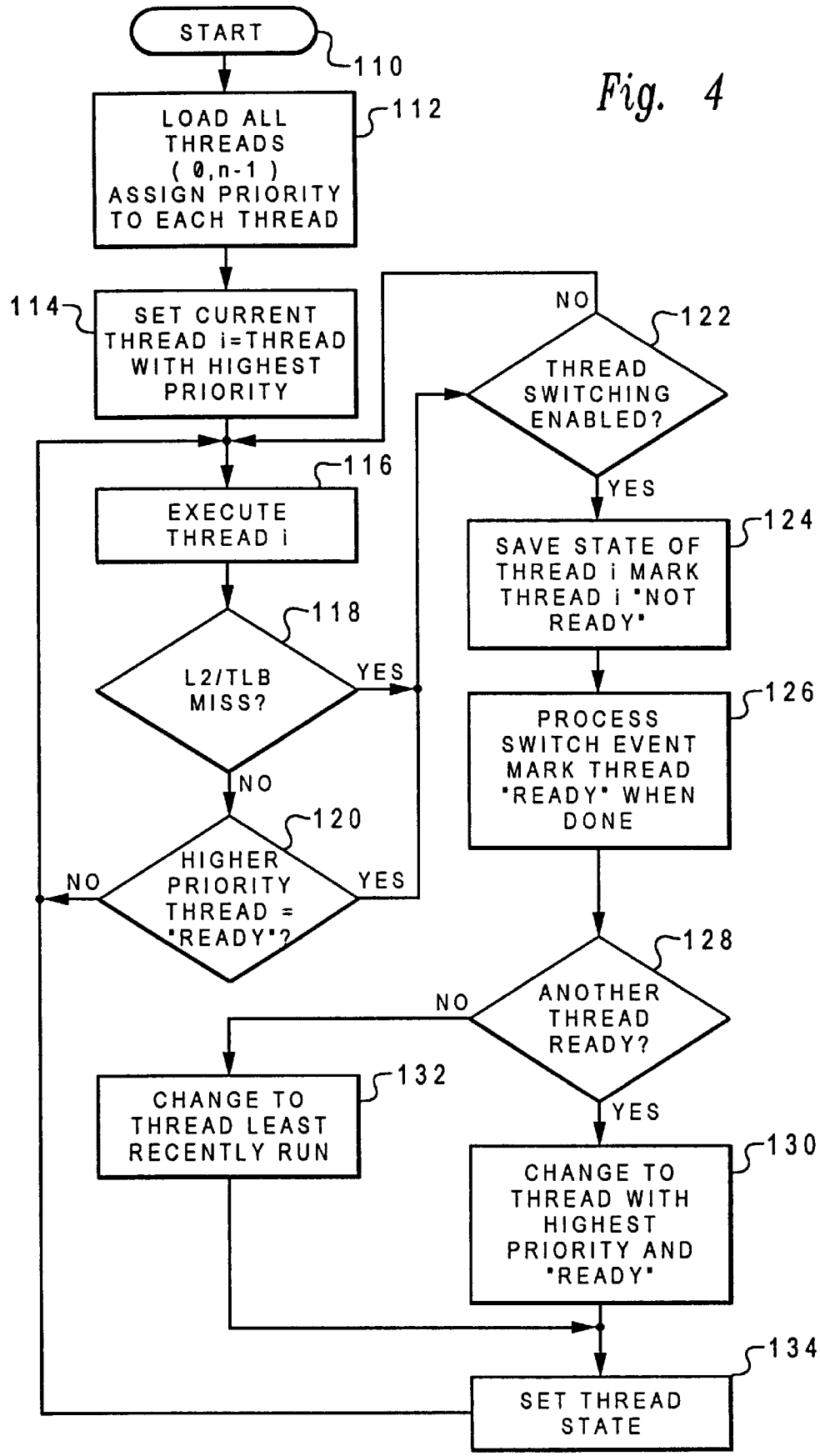
FIG. 4 is a high level logic flowchart of a process which may be implemented within the data processing system of FIG. 1 which illustrates a preemptive prioritized thread management system in accordance with the method and system of the present invention.

Referring now to FIG. 4 there is depicted a high level logic flowchart of a process which may be implemented within the data processing system of FIG. 1 which depicts a preemptive prioritized thread management system in accordance with the method and system of the present invention. As illustrated, this process begins at block 110 and thereafter passes to block 112. Block 112 illustrates the loading of all threads (0, n−1) and the assignment of an associated priority to each thread. Thereafter, the process passes to block 114. Block 114 illustrates the setting of the current thread i equal to the thread having the highest priority. The process then passes to block 116 which depicts the execution of thread i.

Next, the process passes to block 118. Block 118 illustrates a determination of whether or not a level two cache or translation lookaside buffer miss has occurred and if not, the process passes to block 120. Block 120 illustrates a determination of whether or not a higher priority thread has now been indicated as "READY" and if not, the process returns to block 116 in an iterative fashion, to continue to execute thread i.

Referring again to block 118, in the event a level two cache or translation lookaside buffer miss has occurred the process passes to block 122. As described above, block 122 illustrates a determination of whether or not thread switching is enabled and if not, the process returns to block 116 in an iterative fashion. Referring again to block 118, in the event a level two cache or translation lookaside buffer has not occurred, but, as determined in block 120, a higher priority thread than the current thread now indicates "READY" the process also passes to block 122. Block 122 then determines whether or not thread switching is enabled and if not, the process returns to block 116 in an iterative fashion.

Still referring to block 122, in the event thread switching is enabled, and either a level two cache or translation lookaside buffer miss has occurred, or a higher priority thread than the current thread now indicates "READY" and thread switching is enabled the process passes to block 124. Block 134 illustrates the saving of the state of thread i and the marking of that thread as "NOT READY." Next, the process passes to block 126. Block 126 illustrates the concurrent processing of the switch event, if any, and the marking of the previously current thread as "READY" when that switch event has completed. Of course, those skilled in the art will appreciate that in the event the previously current thread was suspended in response to a higher priority thread indicating a "READY" state no switch event will be processed and the previously current thread will be marked "READY." Next, the process passes to block 128. Block 128 illustrates a determination of whether or not another thread is ready and, if the process has occurred as a result of a level two cache or translation lookaside buffer miss a determination of the ready state of each thread will be required; however in the event the thread switch occurs as a result of a higher priority thread indicating a "READY" state then the higher priority thread will clearly be available, as determined at block 128. Thereafter, the process passes to block 130 which illustrates the changing of the current thread to the thread having the highest priority and an indication of "READY."

Alternately, still referring to block 128, in the event the thread switch has occurred as a result of a level two cache or translation lookaside buffer miss the process passes to block 132. As described above, block 132 illustrates the changing of the current thread to the thread which was least recently run in accordance with the theory that this thread will be the first thread to achieve a "READY" state. Thereafter, the process again passes to block 134 which illustrates the setting of the thread state for the new current thread and the process then returns to block 116, in an iterative fashion, as described above.

Figure 5:
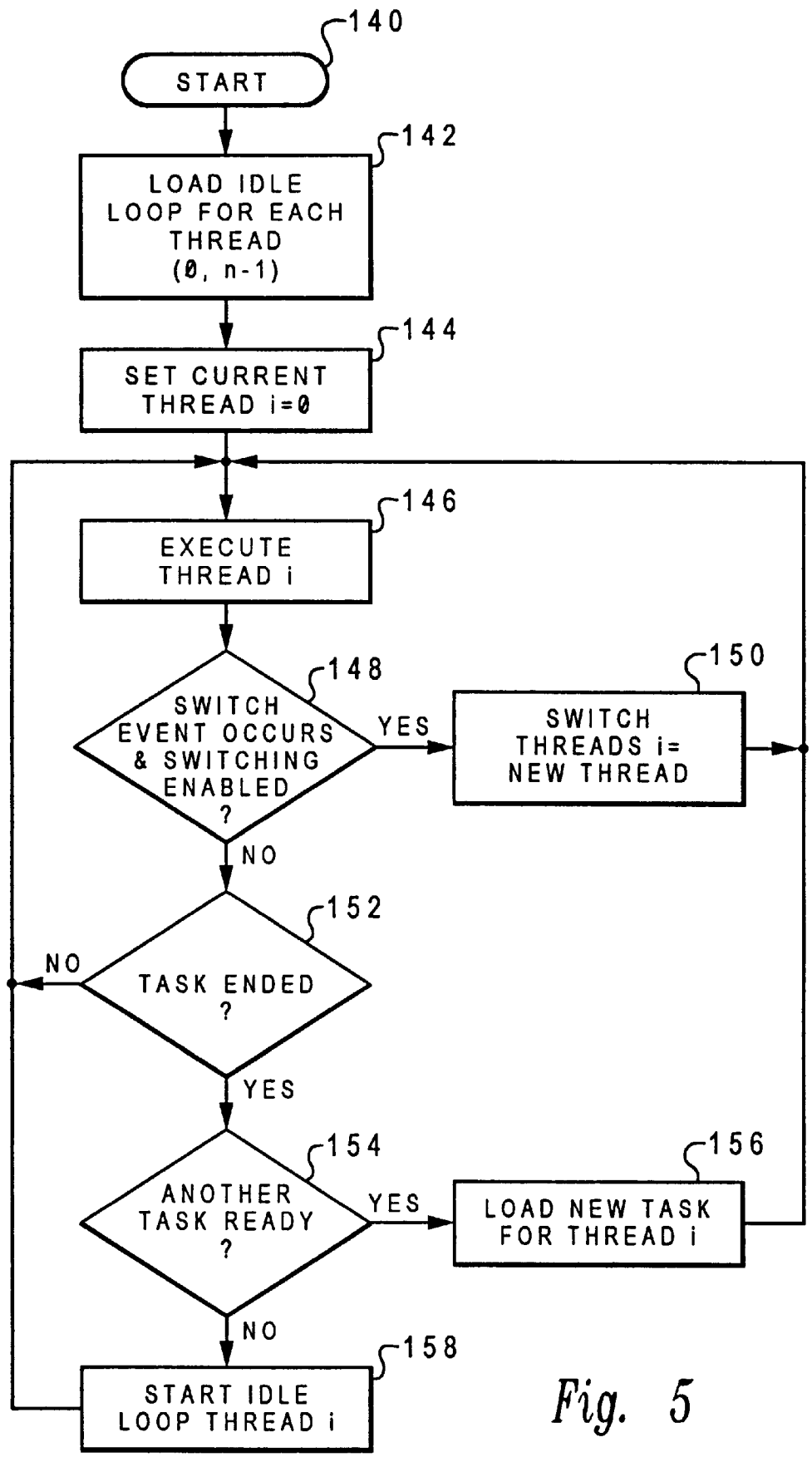
FIG. 5 is a high level logic flowchart of a process which may be implemented within the data processing system of FIG. 1 which illustrates a first thread management system in accordance with the method and system of the present invention.

With reference now to FIG. 5 there is depicted a high level logic flowchart which illustrates a process which may be implemented within the data processing system of FIG. 1 which depicts a first thread management system in accordance with the method and system of the present invention. As depicted, this process begins at block 140 and thereafter passes to block 142. Block 142 illustrates the loading of an idle loop for each thread (0, n−1). Next, the current thread is set i=0, as depicted in block 144.

The process then passes to block 146 which illustrates the execution of thread i and the process then passes to block 148. Block 148 illustrates a determination of the occurrence of a switch event while thread switching is enabled. If this occurs the process passes to block 150 which illustrates the switching of threads and the setting of a new current thread. The process then returns to block 146, in an iterative fashion.

Referring again to block 148, in the event a determination is made that no switch event has occurred, the process passes to block 152. Block 152 illustrates a determination of whether or not a task within the current thread has ended and if not, the process returns to block 146 in an iterative fashion to continue execution. However, in the event a task has ended the process passes to block 154. Block 154 depicts a determination of whether or not another task is ready for execution within the current thread and if so, the process passes to block 156. Block 156 illustrates the loading of the new task for the current thread and this process then returns, in an iterative fashion, to block 146 to continue execution of the current thread.

Still referring to block 154, in the event no further tasks are ready within the currently executing thread the process passes to block 158. Block 158 illustrates the starting of the idle loop for thread i and the process then returns, in an iterative fashion, to block 146 to await the occurrence of one of the enumerated events.

Figure 6:
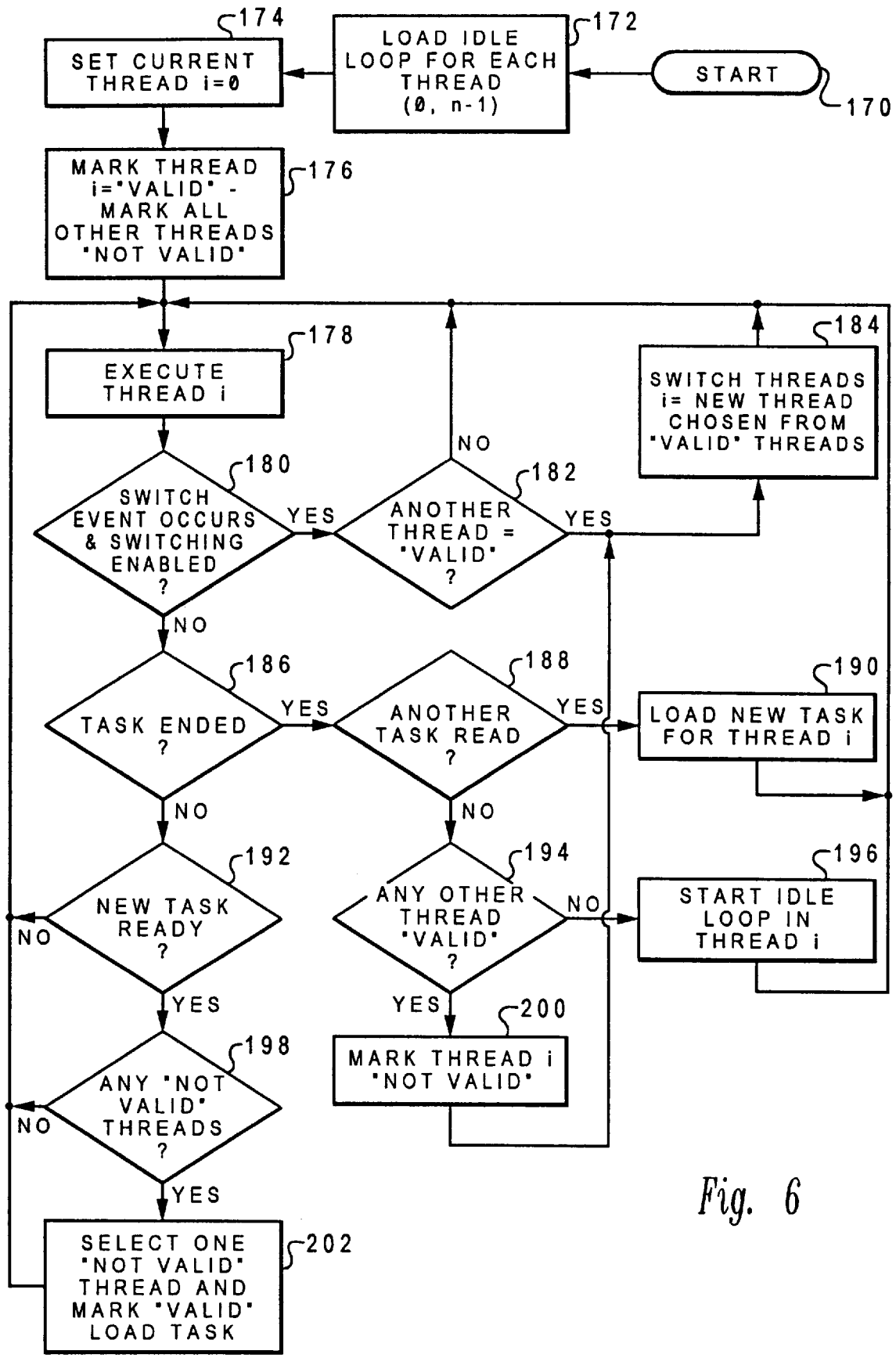
FIG. 6 is a high level logic flowchart of a process which may be implemented within the data processing system of FIG. 1 which illustrates a second thread management system in accordance with the method and system of the present invention.

Finally, referring to FIG. 6 there is depicted a high level logic flowchart of a process which illustrates a process which may be implemented within the data processing system of FIG. 1 which depicts a second thread management system in accordance with the method and system of the present invention. As illustrated, this process begins at block 170 and thereafter passes to block 172. Block 172 illustrates the loading of an idle loop for each thread (0, n−1). Thereafter, as depicted within block 174, the current thread i is set=0. Next, the process passes to block 176. Block 176 illustrates the marking of the current thread as "VALID" and the marking of all other threads as "NOT VALID." The process then passes to block 178. Block 178 illustrates the execution of thread i.

Thereafter, as depicted in block 180 in the event a determination is made as to whether or not a switch event has occurred while switching is enabled. If so, the process passes to block 182. Block 182 indicates a determination of whether or not another thread within the system is "VALID." If not, the process returns to block 178, in an iterative fashion, to continue execution of thread i. Alternately, in the event another thread is determined as "VALID." The process passes to block 184. Block 184 illustrates the switching of the current thread to the new thread chosen from among those threads indicating "VALID" state. The process then returns to block 178 to execute the new current thread in the manner described above.

Referring again to block 180 in the event a determination is made that no switch event has occurred or that switching is not enabled, the process passes to block 186. Block 186 illustrates a determination of whether or not the current task has ended and if so, the process passes to block 188. Block 188 illustrates a determination of whether or not another task within the current thread is ready for execution and if so, the process passes to block 190. Block 190 illustrates the loading of the new task for the current thread and the process then returns to block 178, in an iterative fashion to continue execution of the current thread.

Referring again to block 188, in the event a current task has ended, as determined at block 186, and a subsequent task is not ready the process passes to block 194. Block 194 illustrates a determination of whether or not any other tread within the system indicates "VALID." If not, the process passes to block 196 which illustrates the starting of the idle loop for thread i and the process then returns to block 178, in an iterative fashion. However, in the event another thread within the system indicates "VALID" the process passes form block 194 to block 200. Block 200 illustrates the marking of the current thread as "NOT VALID" and the process then returns to block 184 to change the current thread to a new thread chosen from among the valid threads.

Referring again to block 186, in the event the current task is not ended, the process passes to block 192. Block 192 illustrates a determination of whether or not a new task has become ready and if not, the process returns to block 178, in an iterative fashion to continue the execution of thread i in the manner described above. However, in the event a new task has become ready, as determined at block 192, the process passes to block 198. Block 198 illustrates a determination of whether or not any "NOT VALID" threads are present among the threads within the system and if not, the process returns to block 178, in an iterative fashion, to continue to execute thread i. However, in the event a "NOT VALID" thread is present within the system the process passes to block 202. Block 202 illustrates the selection of one "NOT VALID" thread, the marking of that thread as "VALID" and the loading of the task which is now ready into that thread. The process then returns to block 178, in an iterative fashion, to continue to execute i. Thereafter, in the event a thread switch event occurs, a "VALID" thread having the new task present therein is ready for execution.

While the invention has been particularly shown and described with reference to a preferred embodiment, it will be understood by those skilled in the art that various changes in form and detail may be made therein without departing from the spirit and scope of the invention.

We claim:

1. A method for enhanced performance multithread operation in a data processing system which includes a processor, a main memory store and at least two levels of cache memory, said method comprising the steps of:

executing at least one instruction within a first thread;

thereafter storing a state of said processor at a selected point within said first thread, terminating execution of said first thread and switching execution to a second thread only in response to an occurrence of an identified event having a delay associated therewith which exceeds an amount of time required for a thread switch; and executing at least one instruction within said second thread wherein processing delays due to memory access latency are minimized.

2. The method according to claim 1, further including the step of storing an indication of non-validity in association with said first thread in response to a task associated with said first thread ending.

3. The method according claim 2, further including the step of removing said indication of non-validity in association with said first thread following loading of said first thread with a new task to be executed.

4. The method according to claim 1, wherein said data processing system includes a plurality of registers and wherein said step of storing a state of said processor at a selected point within said first thread comprises storing a state of said processor at a selected point within said first thread within a register associated with said first thread.

5. The method according to claim 3, further including the step of determining a validity status for each thread within said data processing system and selecting a second thread for execution in response to said determination.

6. The method according to claim 5, wherein the step of selecting a second thread for execution selects a least recently executed thread for execution.

7. The method according to claim 1, further including the step of selectively inhibiting execution of a subsequent thread within said data processing system in response to a state of a switch enable bit.

8. The method according to claim 1, further including the step of selecting said second thread for execution following said occurrence of said identified event in response to a priority indication associated with each thread within said data processing system.

9. A method for enhanced performance multithread operation in a data processing system which includes a processor, a main memory store and at least two levels of cache memory, said method comprising the steps of:

executing at least one instruction within a first thread;

thereafter storing a state of said processor at a selected point within said first thread, terminating execution of said first thread and switching execution to a second thread only in response to a level two or higher cache miss;

maintaining an address indication for said level two or higher cache miss; and executing at least one instruction within said second thread wherein processing delays due to memory access latency are minimized.

10. The method according to claim 9, further including the step of storing an indication of non-validity in association with said first thread in response to a task associated with said first thread ending.

11. The method according to claim 10, further including the step of removing said indication of non-validity in association with said first thread following loading of said first thread with a new task to be executed.

12. The method according to claim 9, wherein said data processing system includes a plurality of registers and wherein said step of storing a state of said processor at a selected point within said first thread comprises storing a state of said processor at a selected point within said first thread within a register associated with said first thread.

13. The method according to claim 11, further including the step of determining a validity status for each thread within said data processing system and selecting a second thread for execution in response to said determination.

14. The method according to claim 13, wherein the step of selecting the second thread for execution selects a least recently executed thread for execution.

15. The method according to claim 9, further including the step of selectively inhibiting execution of a subsequent thread within said data processing system in response to a state of a switch enable bit.

16. The method according to claim 9, further including the step of selecting said second thread for execution following said level two or higher cache miss in response to a priority indication associated with each thread within said data processing system.

17. A system for enhanced performance multithread operation in a data processing system which include a processor, a main memory store and at least two levels of cache memory, said system comprising:

means for executing at least one instruction within a first thread;

means for thereafter storing a state of said processor at a selected point within said first thread, terminating execution of said first thread and switching execution to a second thread only in response to a level two or higher cache miss;

means for maintaining an address indication for said level two or higher cache miss; and means for executing at least one instruction within said second thread wherein processing delays due to memory access latency are minimized.

18. The system according to claim 17, further including means for storing an indication of non-validity in association with said first thread in response to a task associated with said first thread ending.

19. The system according to claim 18, further including means for removing said indication of non-validity in association with said first thread following loading of said first thread with a new task to be executed.

20. The system according to claim 17, wherein said data processing system includes a plurality of registers and wherein said means for storing a state of said processor at a selected point within said first thread comprises storing a state of said processor at a selected point within said first thread within a register associated with said first thread.

21. The system according to claim 17, further including means for determining a validity status for each thread within said data processing system and selecting a second thread for execution in response to said determination.

22. The system according to claim 21, wherein said means for selecting said second thread for execution selects a least recently executed thread for execution.

23. The system according to claim 17, further including means for selectively inhibiting execution of a subsequent thread within said data processing system in response to a state of a switch enable bit.

24. The system according to claim 17, further including means for selecting said second thread for execution following said level two or higher cache miss in response to a priority indication associated with each thread within said data processing system.

25. A computer program product for enhanced multi-thread operation in a data processing system which includes a processor, main memory store, and at least two levels of cache memory, said computer program product provided within a storage media adapted to be inserted within said data processing system, said computer program product comprising:

instruction means stored within said storage media for executing at least one instruction within a first thread;

instruction means stored within said storage media for thereafter storing a state of said processor at a selected point within said first thread, terminating execution of said first thread and switching execution to a second thread only in response to a level two or higher cache miss;

instruction means stored within said storage media for maintaining an address indication for said level two or higher cache miss; and instruction means stored within said storage media for executing at least one instruction within said second thread wherein processing delays due to memory access latency are minimized.

* * * * *